(12) United States Patent
Ruben et al.

(10) Patent No.: US 8,458,263 B1
(45) Date of Patent: Jun. 4, 2013

(54) METHOD AND APPARATUS FOR ELECTRONIC MESSAGE ARCHIVE VERIFICATION

(75) Inventors: Darlene J. Ruben, Manchester, NH (US); James R. Harris, Amherst, NH (US); Michael R. Brown, Petersborough, NH (US)

(73) Assignee: EMC Corporation, Hopkinton, MA (US)

( * ) Notice: Subject to any disclaimer, the term of this patent is extended or adjusted under 35 U.S.C. 154(b) by 368 days.

(21) Appl. No.: 11/728,907

(22) Filed: Mar. 27, 2007

(51) Int. Cl.
*G06F 15/16* (2006.01)

(52) U.S. Cl.
USPC ............ 709/206; 709/217; 709/219; 707/661

(58) Field of Classification Search
USPC ................... 709/206; 707/661, 665, 667, 668
See application file for complete search history.

(56) References Cited

U.S. PATENT DOCUMENTS

| | | | |
|---|---|---|---|
| 5,890,163 A | 3/1999 | Todd | |
| 5,946,000 A | 8/1999 | Hoel | |
| 6,135,646 A * | 10/2000 | Kahn et al. | 709/217 |
| 6,604,096 B1 | 8/2003 | Couch | |
| 6,609,138 B1 * | 8/2003 | Merriam | 1/1 |
| 6,615,244 B1 * | 9/2003 | Singhal | 709/213 |
| 6,629,138 B1 | 9/2003 | Lambert | |
| 6,879,988 B2 | 4/2005 | Basin et al. | |
| 7,069,573 B1 | 6/2006 | Brooks | |
| 7,222,156 B2 | 5/2007 | Gupta | |
| 7,243,298 B2 | 7/2007 | Yozell-Epstein | |
| 7,379,978 B2 * | 5/2008 | Anderson et al. | 709/219 |
| 7,412,489 B2 | 8/2008 | Nowacki | |
| 7,523,222 B2 | 4/2009 | Carlson | |
| 7,539,709 B1 | 5/2009 | Vengerov | |
| 7,610,339 B2 * | 10/2009 | Evans et al. | 709/206 |
| 7,627,765 B2 * | 12/2009 | Nakamura et al. | 713/181 |
| 7,707,188 B2 * | 4/2010 | Pandya et al. | 707/668 |
| 2002/0032623 A1 * | 3/2002 | Wheeler et al. | 705/28 |
| 2003/0208608 A1 | 11/2003 | Merriam | |
| 2004/0167941 A1 | 8/2004 | Prahlad | |
| 2004/0205514 A1 | 10/2004 | Sommerer | |
| 2004/0221048 A1 | 11/2004 | Ogier | |
| 2004/0221295 A1 * | 11/2004 | Kawai et al. | 719/313 |
| 2004/0225645 A1 | 11/2004 | Rowney | |
| 2005/0108435 A1 * | 5/2005 | Nowacki et al. | 709/246 |
| 2006/0010213 A1 | 1/2006 | Mehta | |
| 2006/0010322 A1 | 1/2006 | Novack | |
| 2006/0031357 A1 | 2/2006 | Misra | |
| 2006/0080278 A1 | 4/2006 | Neiditsch | |
| 2007/0016648 A1 * | 1/2007 | Higgins | 709/206 |
| 2007/0038714 A1 * | 2/2007 | Sell | 709/206 |
| 2007/0061359 A1 | 3/2007 | Kilday | |
| 2007/0067399 A1 * | 3/2007 | Kulkarni et al. | 709/206 |
| 2007/0078768 A1 | 4/2007 | Dawson | |
| 2007/0113035 A1 | 5/2007 | DeVos | |
| 2007/0130264 A1 | 6/2007 | Walker | |

(Continued)

*Primary Examiner* — Linglan Edwards
(74) *Attorney, Agent, or Firm* — Dergosits & Noah LLP; Todd A. Noah

(57) ABSTRACT

Method and apparatus for verification of archived message information for electronic messages, such as email messages, from one or more sources in a computer system. An archive verification unit may be configured to receive information that identifies a plurality of electronic messages in a group located in one or more sources, determine which of the plurality of messages in the group are not archived on a message archive system, and provide a report identifying which of the plurality of messages in the group are not archived on the message archive system.

19 Claims, 3 Drawing Sheets

U.S. PATENT DOCUMENTS

2007/0168435 A1\* 7/2007 Moraca et al. ................ 709/206
2007/0180033 A1 8/2007 Singh
2007/0198797 A1 8/2007 Kavuri
2007/0250552 A1 10/2007 Lango
2008/0010350 A1 1/2008 Chen
2008/0028028 A1 1/2008 Chismark \* cited by examiner

FIG. 2

METHOD AND APPARATUS FOR ELECTRONIC MESSAGE ARCHIVE VERIFICATION

BACKGROUND

Electronic messages are widely used and may take different forms (e.g., email messages, news updates, RSS or other feeds, etc.). Frequently, there is a need to store a backup or other type of copy of messages, e.g., to provide redundancy to help ensure that a message is available for later use and/or to free up storage space used by a message handling system (such as an email server or other email handling system) by offloading messages to another storage location. This type of storage is commonly called archiving, and various applications have been developed to archive messages, such as email messages.

BRIEF DESCRIPTION OF THE DRAWINGS

Embodiments are described with reference to the following drawings, in which:

FIG. 2 is an illustrative graphical user interface including archive verification information in an illustrative embodiment.

DETAILED DESCRIPTION

Figure 1:
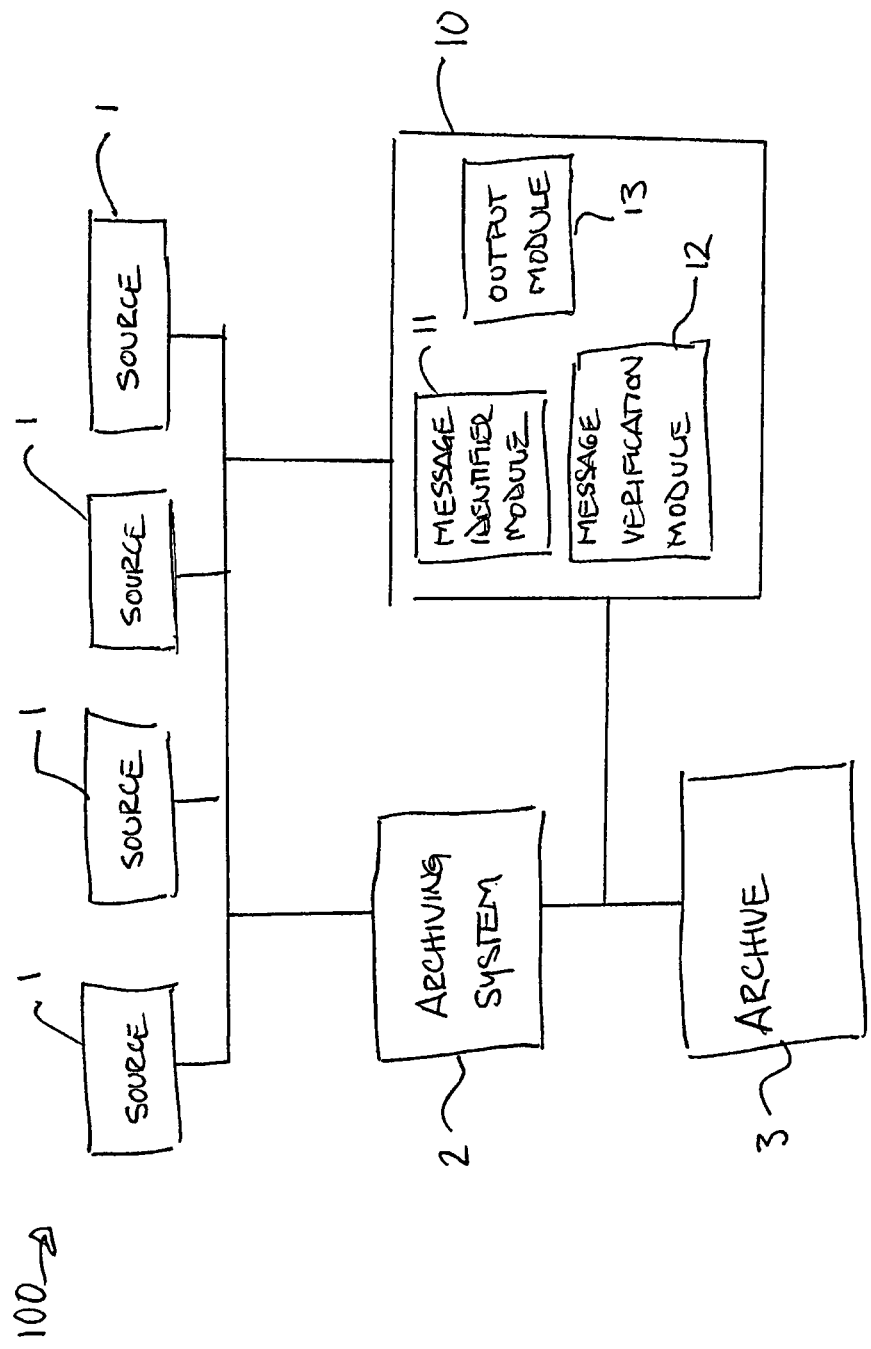
FIG. 1 is a schematic block diagram of a computer system including message archive verification features in accordance with aspects of the invention.

The inventors have appreciated that although message archiving systems can be effective in identifying messages for archiving and actually archiving the messages, there is a need to allow for verification that particular messages or groups of messages have, in fact, been successfully archived. For example, some messages may include valuable information that would be difficult or impossible to recreate if deleted from a computer system or otherwise lost. Users may wish to actually verify that such messages have been archived. In other cases, regulatory or other government agencies may require entities to store messages for a particular amount of time to comply with various rules and regulations, such as those imposed by the Securities and Exchange Commission (SEC) and others. These agencies and other bodies may require that an entity prove that appropriate archiving protocols have been implemented and are operating properly. Accordingly, aspects of the invention allow for verification of message archiving.

In one aspect of the invention, a plurality of messages may be identified, and a determination may be made whether each of the messages has a counterpart message located in a message archive. Information may be provided regarding the determination process, e.g., a report may be provided that identifies messages that were and/or were not located in the message archive. The information may be provided, for example, in a graphical user interface or otherwise, and may be useful to help ensure the integrity of the archival process and/or ensure that potentially important messages are properly stored in the message archive for possible future reference.

The plurality of messages may be initially identified for archive verification in any suitable way, such as by specifying that all of the messages currently stored in a particular location in an email handling system, such as a user's email inbox, a journaling mailbox, or other source, are to be subjected to archive verification. Thereafter, a determination may be made regarding which email messages in the specified source have been archived, and information regarding the archive verification provided. Verifying that each targeted source message has been archived may require that each message be uniquely identified in relation to other messages in the computer system, e.g., to allow for the detection of matches between a unique message identifier for each source message and message identifiers for archived messages. Messages in sources that are targeted for archive verification may be individually identified by a message identifier in any suitable way. For example, an email handling system may generate a log of all email messages received into the system or otherwise processed. The log may include information that uniquely identifies each of the messages from other messages in the system, e.g., an email server log may include message identifiers provided by the email handling system such as a timestamp for each message and/or an identification (ID) number that is randomly assigned to each message. Instead of, or in addition to, using message identifiers from an email server log to identify messages in sources for archive verification, in one illustrative embodiment, message identifiers may be specially generated for each of a plurality of messages in a source of a computer system at the time of, or before, archive verification. For example, the message identifiers may be generated immediately before archive verification by applying a hash function to one or more fields of each message, such as the message text field. Other suitable message identifiers may be used, such as user provided message identification numbers, shortcut identifiers for messages in an email folder, one or more selected portions of a message (such as the sender, recipient and subject fields), and so on. In short, any suitable information that uniquely identifies a message may be used as a message identifier.

The determination of whether a particular message from a source has a corresponding message in a message archive may be performed in any suitable way. For example, message identifiers for messages in a source may be compared to message identifiers for messages in a message archive, where the message identifiers were generated in the same way or other comparable fashion for both the source and archived messages. Since the message identifiers are unique for each message, a match between message identifiers for a message from the source and for a message in the archive can identify the presence of an archived message. In one illustrative embodiment, message identifiers may take the form of alphanumeric strings, and a comparison of message identifier strings may be used to identify the presence of an archived message. Alternatively, the message identifier may take the form of one or more portions of a message, and the corresponding portions of archived messages and messages whose archival is to be verified may be compared to identify suitable matches. Message identifiers for archived messages may be stored in any suitable location (e.g., with other portions of the message in the archive, or in a suitable data store), and/or may be generated at or about the time of message archive verification. Thus, archived messages need not necessarily be stored with message identifiers used in verification, as the message identifiers for archived messages may be generated when needed.

After checking to determine the presence of an archived message for messages from a source (or from multiple sources), any suitable information regarding the determination of whether messages have a corresponding archived message may be provided to a requestor (e.g., a system administrator or other user). For example, information regarding messages that have a corresponding archived message and/or that do not have a corresponding archived message may be provided. In addition or alternately, information regarding a total number of message identifiers that were checked against archived messages may be provided and/or information regarding an error state of an archived message corresponding to a message identifier (e.g., an indication that a connection to the archive could not be made, that a connection to a source could not be made, or some other error occurred during archive verification) may be provided. The information may be reported in any way, such as aurally (such as by speaker or other sound producing device), in printed form on cellulose-based and/or electronic paper, via a graphical user interface, or in any other suitable way.

Aspects of the invention are described herein with reference to illustrative embodiments. However, it should be understood that aspects of the invention are not limited to the illustrative embodiments, but rather may be implemented in any suitable way, whether alone or in any suitable combination with one or more other aspects of the invention. For example, aspects of the invention are described with reference to archived email messages, but aspects of the invention may be employed with any type of archiving system that operates to archive any suitable type of message.

FIG. 1 shows an illustrative computerized environment on which aspect of the invention can be implemented. This embodiment includes a computer system 100 having a plurality of message sources 1. In this illustrative embodiment, the message sources 1 may include any suitable logical or physical locations for messages, including one or more individual email mailboxes, a journaling mailbox, a file, folder or other location external to an email message system (such as a Lotus Notes folder), and/or an SMTP directory. The messages associated with the sources 1 may be handled using any suitable system, such as an email server or other email handling system (like Exchange or Domino), or other. The computer system 100 may also include any other suitable hardware (such as one or more general purpose programmable computers in the form of PDAs, laptop computers, servers, cellular telephones, and so on), software (which may operate on one or more computers or other devices), communication systems (such as the Internet, one or more wired or wireless local area networks (LANs), a telephone network, etc.), and any other suitable components or devices.

The computer system 100 may include, or interact with, a message archiving system 2 that is arranged to archive messages from one or more sources 1, e.g., store a copy of each message from a source 1 in a message archive 3. The message archiving system 2 can be of any type. An example is the EmailXtender provided by EMC Corporation of Hopkinton, Mass., but techniques described herein are not limited. The message archiving system 2 may be arranged in any suitable way to archive messages. For example, the message archiving system 2 may periodically check each of several sources 1 and store a copy of each message in the message archive 3 or a subset of the messages determined by applying one or more rules or criteria. The message archiving system 2 may employ any suitable rules or other criteria when archiving messages, such as archiving only messages received by particular parties, archiving only messages with a timestamp in a particular range, deleting a message from the source 1 and providing a shortcut indication for the message in the source 1 after the message is archived, eliminating duplicate copies of archived messages in the message archive 3, and so on. In short, the message archiving system 2 may operate in any suitable way to archive some or all messages from the computer system 100.

Archived messages may be stored in any suitable way as well. In this illustrative embodiment, the contents of an archived message are stored and the contents of each archived message are indexed to allow for later searching of archived messages. The message contents and other information relating to the message may be stored in any way, e.g., in a flat file, a database arrangement, or any other data store. Message identifier information may be stored as well. For example, a unique message identification number that is generated based on message content (e.g., by applying a hash function such as MD5 or another function) may be stored (e.g., with other message content and/or in a separate database table or file in the archive 3). This message identifier information may be used later in archive verification, as discussed above. Optionally, one or more fields of an archived message may be compressed or otherwise processed, e.g., to reduce storage requirements. For example, the body of an email message and/or any attachments may be compressed to reduce the overall storage space needed to maintain archived messages. Other message fields, such as email sender, recipient or subject fields, may or may not be compressed.

In one aspect, it is possible to verify that messages in one or more sources 1 have been archived in the message archive 3. In this illustrative embodiment, an archive verification unit 10 may interact with the computer system 100 and/or the message archive 3 to verify that messages logically and/or physically located in one or more sources 1 have a corresponding archived message in the message archive 3 and/or note any that do not. For example, if the source 1 is a journaling mailbox, the archive verification unit 10 may receive a tracking log generated by the email handling system that lists all messages handled with respect to the source 1. The tracking log may include a message identifier for each of the messages handled with respect to the source 1, e.g., a tracking ID that is generated by an Exchange email server and that uniquely identifies each message in the journaling mailbox from other messages. Such message identifiers may be determined by a message identifier module 11 of the archive verification unit 10, e.g., by extracting tracking IDs from the tracking log, or the message identifier module 11 may identify message identifiers in other ways. For example, the message identifier module 11 may generate a message identifier for each of one or more messages in a source 1 (such as a user's email inbox) by performing an MD5 hash or other function on one or more portions of the message. Other message identifiers may be identified by the message identifier module 11, such as selected portions of the message (e.g., sender, recipient and subject fields of an email message), a user provided identification number, a timestamp on the message, a message shortcut "pointing" to a secondary storage location for the message in the archive 3 or elsewhere, or other information that uniquely identifies the message from other messages.

Once the message identifier module 11 has identified message identifiers for one or more messages from a source 1, a message verification module 12 may use the message identifiers to determine if a corresponding archived message exists in the message archive 3. For example, if tracking IDs are used as message identifiers, the message verification module 12 may determine if any archived messages have a tracking ID that corresponds to one of the tracking IDs for messages from the source. (The tracking ID for archived messages may be stored in the archive 3 or elsewhere at the time that the message is archived.) If matching tracking IDs are found for a message from the source 1 and an archived message, the message verification module 12 may determine that the message has been archived, e.g., by providing a flag or other indication in a database record or list used by the message verification module 12. Those messages in a source 1 that do not have a corresponding tracking ID in the message archive 3, may be determined to have not been archived.

The message verification module 12 is not limited to using only one type of message indicator when verifying whether a message from a source 1 has a corresponding archived message. Instead, the message verification module 12 may use any suitable set of message identifiers, such as tracking IDs generated by an email handling system, identification numbers generated by the message identifier module 11 using a hash or other function on message content or otherwise, a comparison of one or more fields from messages in the source 1 and archived messages, shortcut information from the source 1 that "points" to an archived message, etc. Also, just as the message identifier module 11 may generate message identifiers for purposes of verification processing, the message identifier module 11 may generate message identifiers for archived messages as well. Message identifiers for archived messages may be generated in advance of verification and stored in the message archive 3 or other suitable location for later use, or may be generated at the time of verification by the message verification module 12.

In another aspect, the message identifier module 11 may generate message identifiers for archived messages, e.g., to allow for verification in the case that different techniques were used to generate message identifiers at the time of archiving and/or to accommodate for message information that may have been modified during or after the archiving process. For example, in some cases, email messages that were archived at some time in the past may have had an MD5 hash performed on several fields of a message, such as sender, recipient, timestamp and subject fields, as well as a property or field added to the message by the email handling system, and the hash result may have been stored as a message identifier with the archived message. However, in some cases, the message that remained in the source 1 may have had the added property or field changed or otherwise modified at some time after archiving. In this case, a MD5 hash later performed on the fields of the message in the source 1 (including the added property or field) will not match the MD5 hash message identifier for the corresponding archived message. Accordingly, the message identifier module 11 may generate a "new" message identifier for the archived message, e.g., using a hash of the sender, timestamp and subject fields and not using the added property or field, which is then stored in the message archive or otherwise made available. The message identifier module 11 may generate message identifiers for messages in sources using the same technique, and the resulting message identifiers may be used by the message verification module 12 to determine if corresponding archived messages are present in the message archive 3.

This aspect of the invention may also be helpful in providing backwards compatibility, e.g., where a message archiving system is changed to use a different algorithm for generating message identifiers for messages that are archived. In such a case the archive verification unit 10 may not be able to "know" what algorithm was used to generate message identifiers for messages that are stored in the message archive, and thus may not be able to ensure that message identifiers generated for messages in a source will appropriately match identifiers for corresponding archived messages. Accordingly, the message identifier module 11 may use a specified algorithm to generate "new" message identifiers for archived messages that were stored before the message archiving system was changed to use the different algorithm. Alternately, the message identifier module 11 may be able to accommodate situations in which information for messages in a source 1 has been changed, as in the case where one or more added fields of messages in the source are truncated or otherwise altered after archiving as discussed above. If the truncation or other alteration of the source messages would have an effect on message identifier determination, the message identifier module 11 may use different message fields to determine the message identifiers used by the message verification module 12, and use the same technique to generate new message identifiers for archived messages, thereby allowing effective identification of corresponding archived messages for messages in the source 1.

Based on the verification process performed by the message verification module 12, an output module 13 may provide a computerized output suitable for display to a user. Any suitable content may be provided in the output, and the content may be presented in any suitable way. For example, the output module 13 may generate information for display of a graphical user interface that indicates a total number of message identifiers that were checked against archived messages in the message archive, an error state of one or more archived messages that should correspond to a message in a source, information that an archived message corresponding to a message identifier was not found in the message archive, and/or information that an archived message corresponding to a message identifier was found in the message archive. The graphical user interface may be static in the sense that a user cannot change the appearance of the information presented, or may allow for user modification and/or user activation of related displays. For example, the graphical user interface may include a link for a message that allows the user to select the link and display the associated message contents or other related information.

Figure 2:
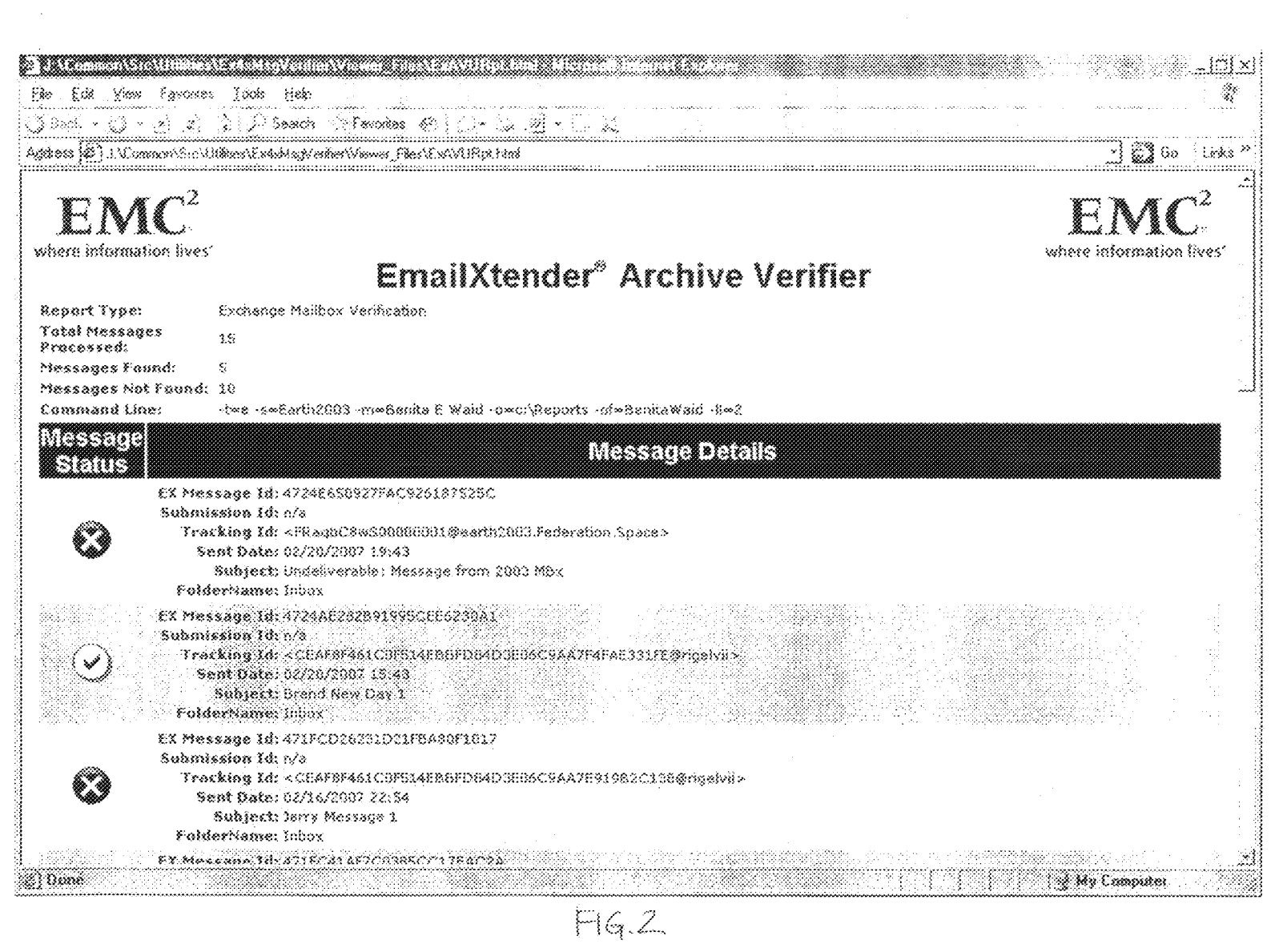

FIG. 2 shows one illustrative display that may be provided based on output from the output module 13. In this illustrative embodiment, the display is generated by an HTML viewer based on an XML file generated from the verification processes performed by the message verification module 12. In this illustrative embodiment, the graphical user interface displays information regarding the total messages processed (i.e., 15—the number of messages in a source that were processed to determine if corresponding archived messages exist), as well as the number of archived messages found (i.e., 5—the number of messages in the source that had corresponding archived messages) and the number of archived messages not found (i.e., 10—the number of messages in the source that did not have corresponding archived messages). Also displayed is a "command line", in this case a set of commands provided by a user for the archive verification unit 10 to use in performing the verification process. In this embodiment, by implementing different command lines, a user may cause the archive verification unit 10 to perform different verification processes, e.g., verify archive message status for messages in different sources, display verification information using different display formats, etc. In this illustrative display, "Message status" is displayed for each of the messages that were processed, which in this case indicates whether a corresponding archived message was found (indicated by a "checkmark") or not (indicated by an "X"). Selected details for each message are also displayed, including an "EX Message Id" (a message identifier generated by the archiving system, in this case the EmailXtender system), a "Submission Id" (a message identifier returned when an email message is delivered), a "Tracking Id" (a message identifier generated by the email handling system, in this case an Exchange email server), a "Sent Date" for the message, a "Subject" field for the message, and a "FolderName" (the source of the message). A selectable link may be provided for each message, e.g., the "Tracking Id" may have an associated link that allows a user to click on the link and display the corresponding message and/or other related information.

It should be understood that the various modules and other components of the archive verification unit 10 may be implemented by any suitable combination of software, firmware, hardware and/or other components in a general purpose programmable computer or distributed system of such computers wherein the computers can be coupled using any communication medium (e.g., a network). The archive verification unit 10 may reside in whole or in part in the computer system 100, or may be implemented in a separate computer system. For example, the sources 1, archive system 2, archive 3 and other portions of the computer system 100 may be implemented in one or more computers (e.g., coupled via a LAN or other suitable network or other communication medium). The archive verification unit 10 may be implemented on one or more of the computers in the computer system 100, or via a separate computer system that communicates with the computer system 100 via the Internet or any other suitable communications medium.

Figure 3:
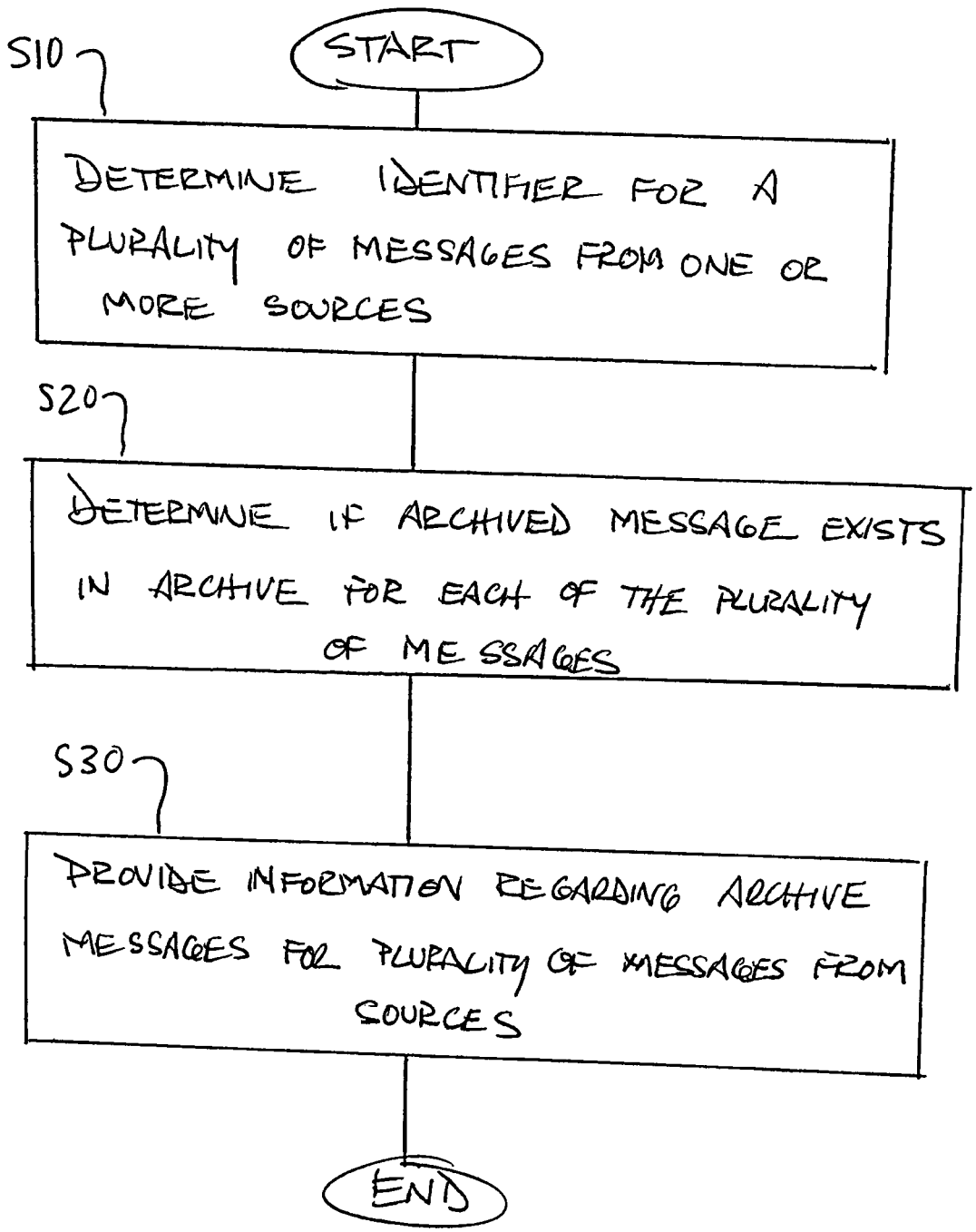
FIG. 3 is a flowchart of steps in a method for archive verification in an illustrative embodiment.

FIG. 3 shows a flowchart of steps for a method of archived message verification in one illustrative embodiment. In step S10, an identifier is determined for a plurality of messages from one or more sources in a computer system. As discussed above, the identifier may take any suitable form, such as a user supplied identification number, a tracking log ID generated by an email handling system, one or more portions of a message (e.g., the sender, recipient and timestamp fields), a content-based identification number (e.g., generated by performing an MD5 hash or other function on one or more fields of a message), a shortcut identifier in a source that "points" to another location where the message is stored (whether in archive or not), and so on. The message sources may be any logical and/or physical location in a computer system, including one or more email inboxes, sent boxes, etc., a journaling mailbox, a folder or file separate from an email server (such as a folder storing Lotus Notes files), an SMTP directory, and so on. Messages in a source need not necessarily be accessed to determine an identifier for the messages used in verification. Instead, the identifiers may be obtained in a more indirect way, such as from a tracking log. Also, message identifiers need not necessarily be determined for all messages in one or more sources. In some embodiments, only a subset of messages in a source or sources may be determined and used for archive verification.

In step S20, a determination is made whether an archived message exists in a message archive for each of the plurality of messages. This determination may be made based on a comparison of message identifiers determined in step S10 to counterpart message identifiers for archived messages. For example, if a content-based message identifier is determined for a message from a source in step S10, the content-based message identifier may be compared to other content-based message identifiers for archived messages. If a match is found, it may be determined that an archived message exists for the message in the source.

This verification process is not limited to use of only one type of message identifier, but instead may involve two or more different types of identifiers. For example, a first message in a source may have a content-based identifier determined for it in step S10, whereas a second message in the source may have its message identifier determined based on a tracking ID (the tracking ID may or may not be content-based, and in this example is not a content-based identifier). Archived message verification for the first message may involve comparison of the content-based identifier to other content-based identifiers for archived messages. Verification for the second message may involve comparison of the tracking ID to other tracking IDs for archived messages.

Step S20 may additionally involve determination of message identifiers for archived messages, if a suitable message identifier is not stored with the archived message or otherwise available for verification. As discussed above, in some cases a message identifier that is generated and stored with an archived message at the time of archive may not be useable during later archive verification processing, e.g., because information added to the original message in the source is changed or otherwise modified so that it may be impossible to regenerate the message identifier. In this case, a secondary or auxiliary message identifier may be determined using a different technique to allow for effective verification. For example, a message identifier stored with an archived message may have been determined using a content-based hash function applied to sender, recipient and subject fields of the message as well as to an added field. However, messages in a source may have had the added field truncated or otherwise altered after archiving. As a result, it may be impossible to generate the same content-based identifier using the sender, recipient, subject and added fields of the source message, i.e., because the added field for the message has changed. To allow for verification, an auxiliary identifier may be generated for the archived messages, e.g., using a hash function applied to sender, recipient and subject fields only. The same identifier generation algorithm may be used to determine message identifiers for the messages in a source, and the auxiliary identifiers may be used to determine if messages in the source have corresponding archived messages.

During the verification checking, a list, database or other suitable record may be generated that indicates whether an archived message was found for messages from a source. For example, a flag or other indication may be provided in a database table for each of the message identifiers that represents the presence/non-presence of an archived message for each source message being verified. Other indications may be provided, including an indication that a connection to the archive could not be successfully established, that a connection to a source could not be established, that an archived message was located, but that the archived message is not complete and/or that there is some related problem in the message archive, and so on.

In step S30, information regarding the verification process of step S20 may be provided for the plurality of messages from the source(s). The information provided may include any suitable set of information and be provided in any suitable way, whether visually, aurally, in stored electronic format (e.g., on a DVD disc or other volatile or non-volatile storage), and so on. In one illustrative embodiment, a graphical user interface may be generated and displayed for a user that provides the types of information as shown in FIG. 2, for example. A user may be permitted to customize the way in which information is presented in the graphical user interface, e.g., alter the order in which messages are displayed, apply one or more filters to messages displayed, access additional details for one or more messages, and so on. For example, if the graphical user interface displays that five (5) messages did not have an archived message found, the user may "click" on the "5" to have further details regarding the five messages displayed. Accordingly, a user may use the graphical user interface to verify that messages in one or more sources have corresponding archived messages, and for those messages not having a corresponding archived message, may determine details regarding the messages.

Prior to step S10, a user may be enabled to provide a command line or other instructions to an archive verification unit as to how archive processing should be performed. For example, the user may define sources, individual messages or groups of messages or other details regarding which messages should be subjected to archive processing. In one illustrative embodiment, the user may define that all messages in a particular source having a timestamp on a certain date should be checked to see if corresponding archived messages exist. The user may also define which message archive should be accessed for verification processes (in the case that two or more message archives are available). The command line or other instructions may also define the way in which the verification information is displayed, e.g., by defining a "canned" report format to be used.

Aspects, including embodiments described above, can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer environment resource to implement the aspects of the present invention discussed herein. In addition, it should be appreciated that the reference to a computer program which, when executed, performs the above-discussed functions, is not limited to an application program running on host computer. Rather, the term computer program is used herein in a generic sense to reference any type of computer code (e.g., software or microcode) that can be employed to program a processor to implement the above-discussed aspects of the present invention. It should be appreciated that in accordance with several embodiments of the present invention wherein processes are implemented in a computer readable medium, the computer implemented processes may, during the course of their execution, receive input manually (e.g., from a user).

While aspects of the invention has been described with reference to various illustrative embodiments, the invention is not limited to the embodiments described. Thus, it is evident that many alternatives, modifications, and variations of the embodiments described will be apparent to those skilled in the art. Accordingly, embodiments of the invention as set forth herein are intended to be illustrative, not limiting. Various changes may be made without departing from the invention.

What is claimed is:

1. A method for use in a computer system comprising a message handling system that manages a plurality of electronic messages, a message archive system and an archive verification unit, wherein the message archive system includes a message archive for archiving at least some of the plurality of messages, the method comprising:
   (A) receiving, by the archive verification unit, a plurality of message identifiers, each of the message identifiers is generated by applying a first function to at least a portion of the message when the message was archived and uniquely identifies one of the plurality of messages;
   (B) applying, by the archive verification unit, one or more rules to determine that some of the plurality of messages in the group should not be archived and some of the plurality of messages in the group should be archived;
   (C) determining, by the archive verification unit, that some of the message identifiers of the plurality of messages in the group that should be archived do not have corresponding message identifiers on the message archive system by applying the first function to each of the plurality of messages in the group to generate a message identifier that is used to compare to the message identifier for the archived message; and
   (D) providing, from the archive verification unit, a report identifying the plurality of messages in the group that should be archived that do not have the corresponding message identifiers on the message archive.

2. The method of claim 1, wherein the report directly identifies those messages in the group that should be archived that do not have a corresponding archive message on the message archive.

3. The method of claim 1, wherein the report indirectly identifies those messages in the group that should be archived that do not have a corresponding archive message on the message archive by directly identifying those messages in the group that should be archived that do have a corresponding archive message on the message archive.

4. The method of claim 1, wherein (A) comprises:
   identifying the plurality of message identifiers for messages in the group that should be archived that are present in one or more sources in the computer system, each of the message identifiers including at least information that uniquely identifies a corresponding message with respect to other message identifiers and corresponding messages in the computer system.

5. The method of claim 4, wherein the plurality of message identifiers includes a tracking identifier for each of a plurality of messages in the group that should be archived, that is generated by the message handling system.

6. The method of claim 5, wherein the message handling system includes an email server, the electronic messages are email messages, and the message handling system generates a tracking log including the tracking identifier for each message associated with a source in the computer network.

7. The method of claim 4, wherein the one or more sources includes a journaling mailbox, an individual user's email mailbox, an external mailbox including messages separate from an email system, or a SMTP directory.

8. The method of claim 4, wherein at least one of the message identifiers includes a content-based identifier that is generated based on content of a corresponding message.

9. The method of claim 8, wherein the content-based identifier is generated based on a subject field, a sender field, and a timestamp for the corresponding message.

10. The method of claim 8, wherein the message identifiers include a content-based identifier that is generated based on an MD5 hash of content of the corresponding message.

11. The method of claim 4, wherein the message identifiers include content-based identifiers that are determined based on content of corresponding electronic messages, and tracking identifiers that are generated by a message handling system.

12. The method of claim 4, wherein the message identifiers include at least one shortcut reference to an archived message.

13. The method of claim 1, wherein (D) comprises:
providing the report as a computerized output suitable for display to a user, the report including information regarding:
a total number of messages in the group that should be archived that were checked against archived messages in the message archive,
an error state of at least one archived message corresponding to a message in the group that should be archived,
information that no archived message corresponding to a message in the group that should be archived was found in the message archive, or
information that at least one archived message corresponding to a message in the group that should be archived was found in the message archive.

14. The method of claim 13, wherein the computerized output includes an XML document, the method further comprising:
generating a display of the results for the user based on the computerized output, the display being in an HTML format.

15. A non-transitory computer readable storage medium including instructions that, when implemented by a computer system, causes the computer system to perform a method, the computer system comprising a message handling system that manages a plurality of electronic messages, a message archive system and an archive verification unit, wherein the message archive system includes a message archive for archiving archives at least some of the plurality of messages, the method comprising:
(A) receiving, by the archive verification unit, a plurality of message identifiers, each of the message identifiers is generated by applying a first function to at least a portion of the message when the message was archived and uniquely identifies one of the plurality of messages;
(B) applying, by the archive verification unit, one or more rules to determine that some of the plurality of messages in the group should not be archived and that some of the plurality of messages in the group should be archived;
(C) determining, by the archive verification unit, that some of the message identifiers of the plurality of messages in the group that should be archived do not have a corresponding message identifiers on the message archive system by applying the first function to each of the plurality of messages in the group to generate a message identifier that is used to compare to the message identifier for the archived message; and
(D) providing, from the archive verification unit, a report identifying the plurality of messages in the group that should be archived do not have the corresponding message identifiers on the message archive system.

16. An archive verification system that includes a message archive for archiving one or more messages, the archive verification system comprising:
at least one processor and a non-transitory computer readable storage medium including instructions that, when implemented by the at least one processor, causes the archive verification system to receive information that identifies a plurality of electronic messages located in one or more sources, the information generated by applying a first function to at least a portion of each of the plurality of messages when the plurality of messages were archived, apply one or more rules to determine that some of the plurality of messages in the group should not be archived and that some of the plurality of messages in the group should be archived, determine that some of the plurality of messages in the group that should be archived are archived on the message archive system by applying the first function to each of the plurality of messages in the group to generate information that is used to compare to the information for the archived message, and provide a report identifying the plurality of messages in the group that should be archived and are not archived on the message archive system.

17. The system of claim 16, wherein the archive verification unit includes:
a message identifier module that determines message identifiers for the plurality of messages in the group that should be archived that are located, at least by reference, in one or more sources of the computer system, each of the message identifiers including at least information that uniquely identifies a corresponding message with respect to other message identifiers and corresponding messages in the computer system;
a message archive verification module that checks each of a plurality of message identifiers determined by the message identifier module against a plurality of message identifiers for corresponding archived messages and determines a result regarding whether each of the plurality of messages in the group that should be archived has a corresponding archived message in a message archive; and
a verification output module that generates the report as a computerized output based on the result from the message archive verification module.

18. The system of claim 17, wherein the verification output module is arranged to provide the computerized output representing information suitable for display to a user and including information for each of the plurality of message identifiers regarding:
a total number of messages in the group that were checked against archived messages in the message archive,
an error state of at least one archived message corresponding to a message in the group that should be archived,
information that no archived message corresponding to a message in the group that should be archived was found in the message archive, or
information that at least one archived message corresponding to a message in the group that should be archived was found in the message archive.

19. The system of claim 17, wherein the plurality of messages are email messages handled by an email server, and the message handling system generates a tracking log including a tracking identifier for each message associated with a source in the computer system.

* * * * *